Figure 1:
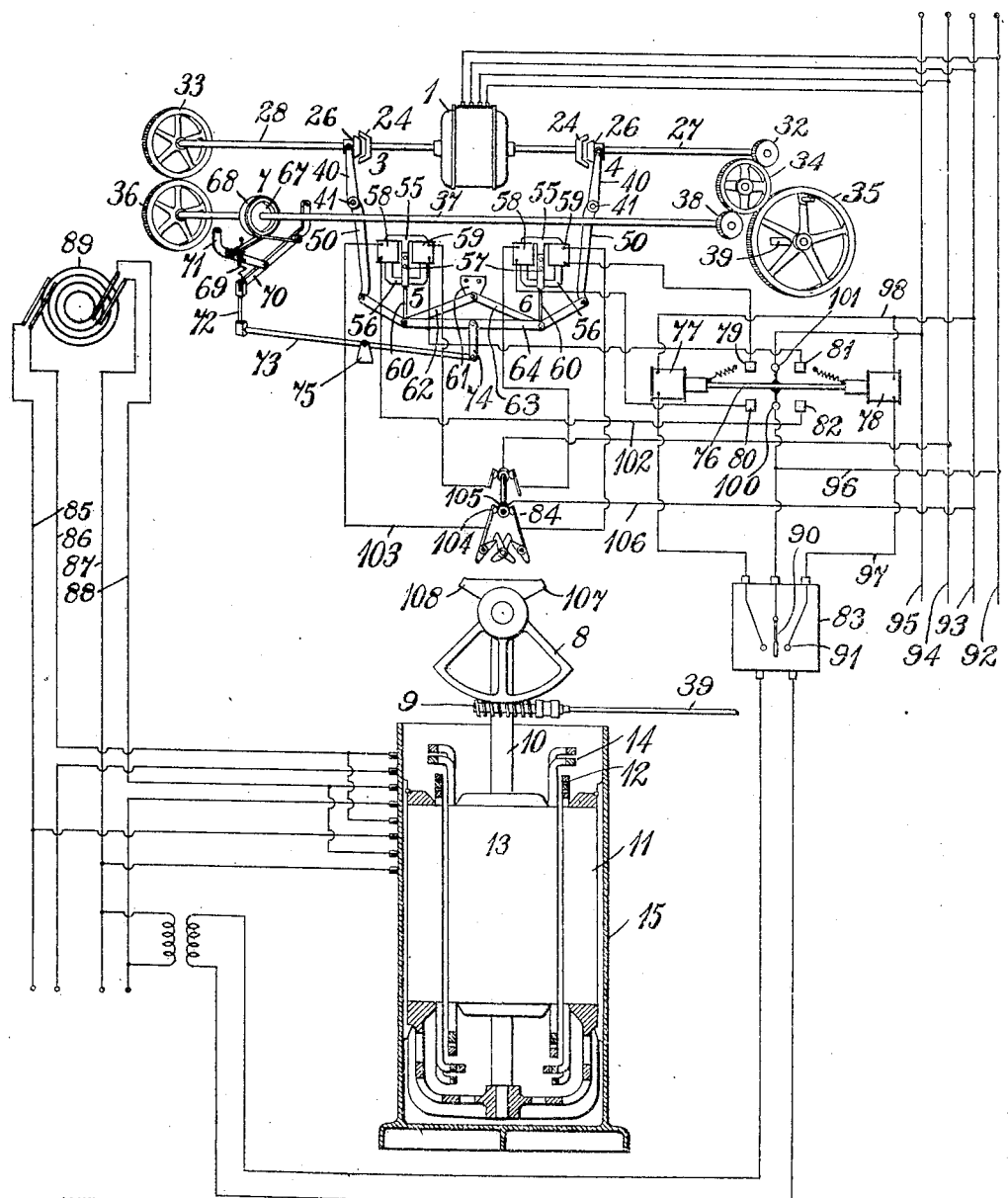

H. D. JAMES.
REGULATOR FOR ELECTRIC CIRCUITS.
APPLICATION FILED FEB. 3, 1910.

1,116,432.

Patented Nov. 10, 1914.
3 SHEETS—SHEET 1.

WITNESSES:
Fred H. Miller
R. H. Dearborn

INVENTOR
Henry D. James
BY
Wesley G. Carr
ATTORNEY

H. D. JAMES.
REGULATOR FOR ELECTRIC CIRCUITS.
APPLICATION FILED FEB. 3, 1910.
1,116,432.
Patented Nov. 10, 1914.
3 SHEETS—SHEET 2.
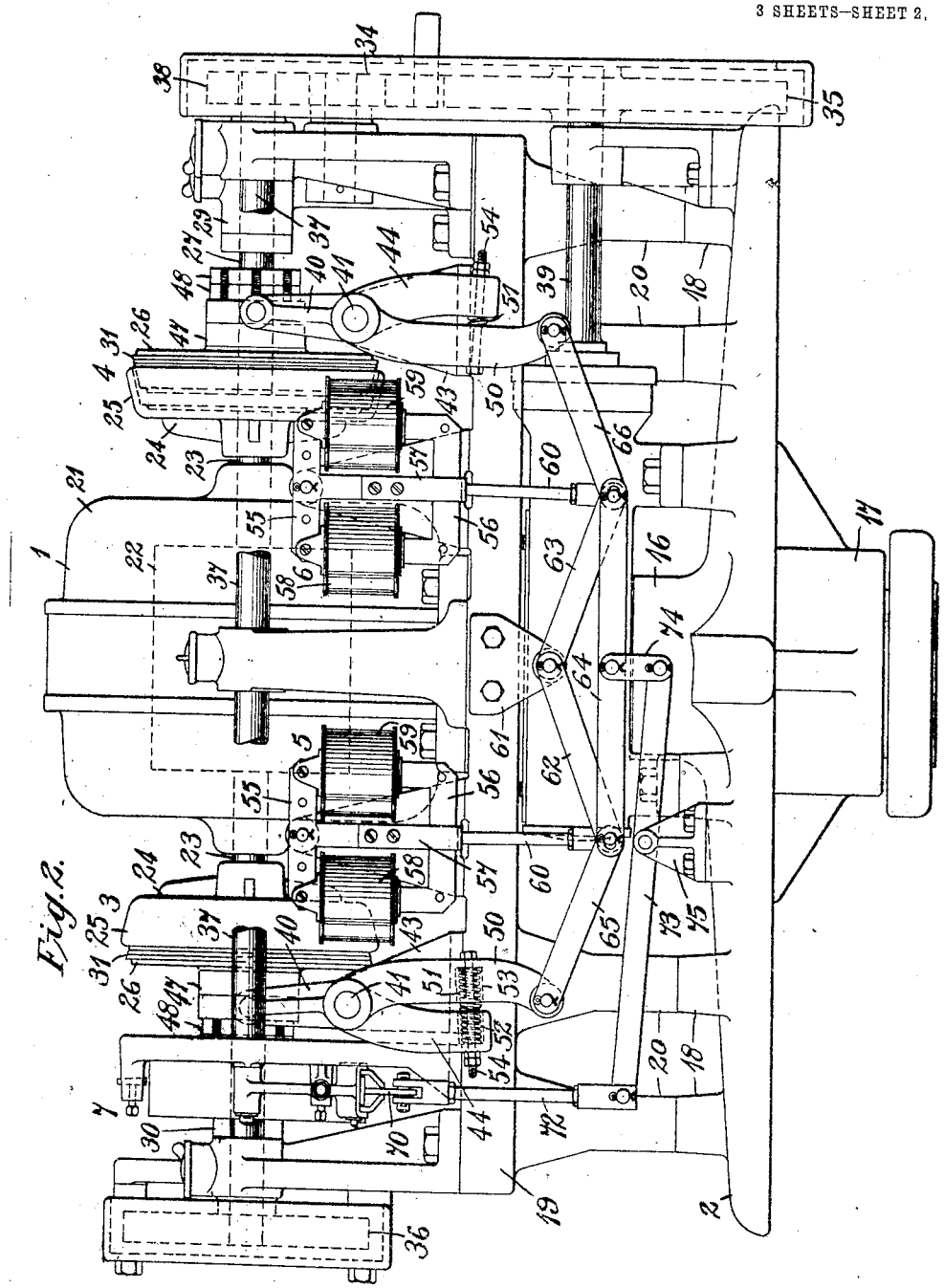

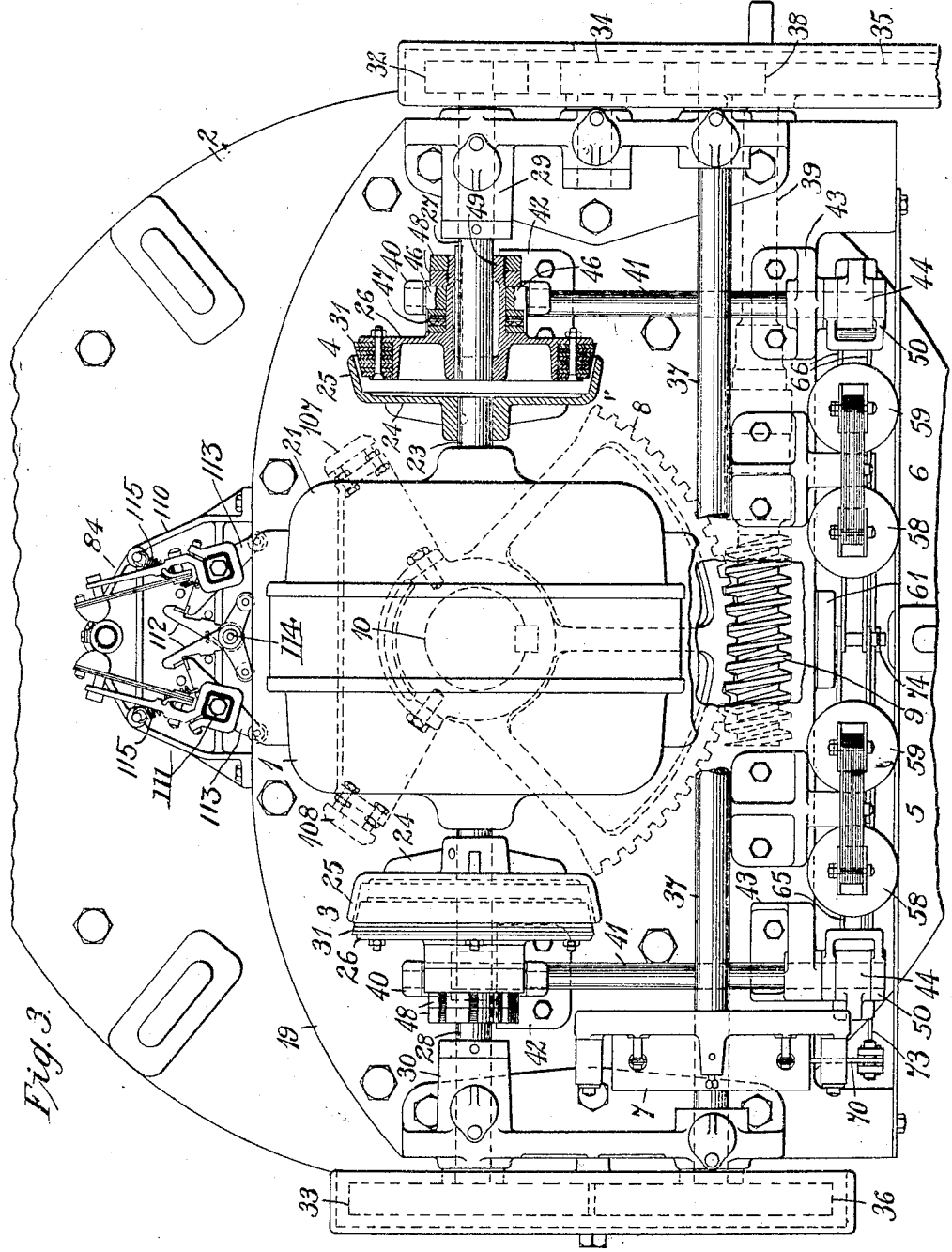

UNITED STATES PATENT OFFICE.

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

REGULATOR FOR ELECTRIC CIRCUITS.

1,116,432.  Specification of Letters Patent.  Patented Nov. 10, 1914.

Application filed February 3, 1910. Serial No. 541,832.

*To all whom it may concern:*

Be it known that I, HENRY D. JAMES, a citizen of the United States, and a resident of Pittsburgh, in the county of Allegheny and State of Pennsylvania, have invented a new and useful Improvement in Regulators for Electric Circuits, of which the following is a specification.

My invention relates to electric circuit regulators and particularly to such transformer regulators as embody relatively movable primary and secondary windings in inductive relation and are known as induction regulators.

One object of my invention is to provide a regulator of the class above indicated, embodying a continuously operating motor of minimum capacity for automatically adjusting the relative positions of the windings in response to a meter relay, or other equivalent device, which is sensitive to potential or other variations in the circuit with which the regulator is associated.

A second object of my invention is to provide relatively simple and particularly effective means for transmitting the energy from the continuously operating regulator motor to the movable winding of the regulator.

In addition to the foregoing, it is my aim to make the regulator motor and the interposed transmission gearing constitute an independent part of the apparatus in order that it may be detached from the regulator at any time without interfering with the hand operation of the device.

In order to secure the aforesaid results without detracting from the effectiveness of the device, I provide mechanical clutches at the respective sides of the continuously operating regulator motor, by means of which the one-way motor rotation may produce a rotation of the movable member of the regulator in either direction, according as the one or the other of the clutches is active. Each of the clutches is provided with an operating electro-magnet, which, in turn, is governed, either directly or indirectly, by the meter relay, or equivalent device, which is adapted to selectively energize the electro-magnets, according as the potential in the circuit to be regulated varies above or below a predetermined amount. The two clutch magnets are mechanically interlocked in order to preclude the possibility of both clutches being actuated at the same time, and a brake is provided for speedily bringing the movable member of the regulator to rest when the clutch magnets are deënergized, the arrangement of parts being such that the brake is only released when the one of the other of the clutches is active.

One of the principal advantages in the regulator of my invention arises from the fact that the movable member of the regulator is made to speedily and precisely respond to the circuit variations while, at the same time, a relatively simple electric driving motor may be employed. This will be evident to those skilled in the art who will easily recognize the fact that a motor of very much larger capacity would be necessary if it were called upon to start from rest in accelerating the movable member of the regulator in the one direction or the other.

Figure 1 of the accompanying drawings is a diagrammatic view of a system of electric current distribution embodying the regulator of my invention. Fig. 2 is an elevation and Fig. 3 is a plan view showing the assembled operating mechanism for the regulator of Fig. 1, certain of the parts being shown in section for the sake of clearness.

Referring to the drawings, the operating mechanism here shown comprises an electric driving motor 1 which is mounted on a base or casting 2 that preferably constitutes the top of the regulator casing, a pair of similar friction clutches 3 and 4, clutch-operating magnets 5 and 6, a brake 7, a worm-wheel segment 8, a worm-gear 9 coöperating with the wheel, and interposed gearing between the worm gear and each of the clutches, whereby continuous rotation of the motor may produce a rotation of the worm in either the one direction or the other, according as the one or the other of the friction clutches is active.

The segment 8 is secured to the upper end of a shaft 10, which forms a part of the rotating member of the regulator. The regulator comprises a stationary core member 11 having a winding 12 associated with it, a movable core member 13 having a winding 14, and an inclosing casing or housing 15 in which the other parts are contained. The member 2, on which the operating mechanism is mounted, constitutes the cover of the housing 15 and, if it is desired to operate the regulator by hand, the parts supported by the cover 2 may be removed as hereinafter set forth, a hand wheel being substituted for the segment 8. The regulator may be adapted for use on either single phase or polyphase circuits, the system of distribution shown in Fig. 1 of the drawings comprising two-phase circuit connections merely for purposes of illustration.

The cover member 2 is provided with centrally located boss projections 16 and 17 that extend outwardly from opposite sides and are suitably bored to constitute a bearing for the upper end of the shaft 10, and a plurality of small boss projections 18 on which a horizontal plate or support 19 is mounted. The member 19 is provided with projections 20 which rest on the projections 18 of the cover member, and which sufficiently separate the two parts to permit the worm gear parts 8 and 9 to operate freely between them.

The operating motor 1 comprises a stationary frame 21, which is mounted on the horizontal plate 19 almost directly above the regulator shaft 10, and a movable member 22 having a shaft 23 which is rotatably supported in suitable bearings provided, in the usual manner, in the stationary frame.

The friction clutches 3 and 4 severally comprise cups 24 which are secured to opposite ends of the motor shaft and have outwardly tapering flanges 25, plug members 26 that are adapted to coöperate with the cups 25 and are adjustably mounted on shaft sections 27 and 28 which are supported in bearings 29 and 30 and are substantially in alinement with the motor shaft. The members 26 are provided with laminated leather rims 31 which are frusto-conical and are adapted to make frictional engagement with the inner tapered surfaces of the flanges 25. The members 26 are keyed to the shaft section on which they are supported in manner as to drive the shafts while they are, at the same time, adjustably supported thereon.

Gear wheels 32 and 33 are secured to the outer ends of the respective shaft segments, the gear wheel 32 meshing with a gear wheel 34, which, in turn, meshes with a gear wheel 35. The gear wheel 33 is also arranged to drive the gear 35 through a gear wheel 36, a shaft 37, a pinion 38 and a gear wheel 34. The arrangement of parts is such that, when the clutch 3 is actuated, the rotation of the gear 33 by the motor 1 produces a rotation of the gear wheel 35 in one direction, while an opposite rotation of the gear wheel is produced when the clutch 4 is actuated. The gear wheel 35 is secured to the outer end of a shaft 39 to the inner end of which the worm gear 9 is secured and, consequently, the operating motor 1 is able to produce a rotative adjustment of the movable member of the regulator in the one direction or the other, according as the clutch 3 or 4 is active.

The movable clutch members 26 are actuated by U shaped levers 40, each of which is secured to one end of a shaft 41, which is rotatably supported in bearing brackets 42 and 43, and to the opposite edge of which an operating lever 44 is secured. Each of the U shaped levers 40 is provided with inward projections 46, which extend between a shoulder 47 of the clutch member 26 and nuts 48 that are screwed upon a sleeve projection 49 of the said clutch member. A pair of bifurcated levers 50 are rotatably supported upon a shaft 41 and are yieldingly connected to the levers 44 by means of interposed springs 51 that engage spring cups or recesses 52 and 53 and are held in position by means of bolts or pins 54 which extend through the two levers and serve to limit the relative movement which is permissible between them. The outer ends of the levers 50 are joined to each other and to the electromagnets 6 by a system of links.

The electro-magnets 5 and 6 are symmetrically arranged, according to the levers 50, upon which they are adapted to act. Each of the electro-magnets comprises a stationary core member 55, a movable core member 56, a guide bracket 57 which limits the rotative movement between the two members, coils 58 and 59 and a rod 60 which is secured to the movable core member 56 and projects from the guide bracket 57 and is connected at its outer end to a system of links. Midway between the rods 60 is a stationary bracket 61 to which a pair of links 62 and 63 are pivotally secured. The outer ends of these links 62 and 63 are connected, respectively, to the ends of the rods 60 and are also joined together by a third link 64, the links 62, 63 and 64 forming a triangle, in the joints of which there is sufficient lost motion to permit one of the electro-magnets, when energized, to raise the rod 60, as hereinafter pointed out, but, when one electromagnet is energized, it is impossible to actuate the other. The ends of the levers 50 are respectively connected to the adjacent corners of the triangle by means of links 65 and 66, which form such an angle with the links 62 and 63 that the action of the rod 60, when one of the electro-magnets is energized serves to produce a rotative movement of the corresponding lever 50, which, in turn, rotates the lever 44, the shaft 41, and the U shaped lever 40 with which it is associated.

The brake 7 comprises a brake-wheel 67, which is secured to the shaft 37 having a friction band or shoe 68 which is brought into engagement with the wheel by means of a spring 69. The brake may be released by levers 70 and 71, which act in opposition to the spring. The lever 70 is connected by links 72, 73 and 74 to the middle point of the link 64, the link 73 being pivotally supported at an intermediate point upon a bracket 75. The arrangement of parts is such that the movement of the link 74 which is produced when either of the electro-magnets is energized, is transmitted through the links to the lever 70 and releases the brake.

The brake forms no parts of my present invention and may be replaced by any other suitable means for quickly and automatically bringing the regulator to rest as soon as the electro-magnets are deënergized.

The electro-magnets are governed directly by a secondary relay switch comprising a movable member 76, operating magnets 77 and 78 and stationary contact members 79, 80, 81 and 82. The secondary relay, in turn, is governed by a primary relay 83 which may be of any suitable meter construction that is adapted to selectively energize the electro-magnets 77 and 78, according as the potential of the main circuit, under regulation, rises above or falls below a predetermined amount. The meter mechanism may, of course, be responsive to some other function of the circuit, if desired. In order to prevent the movable member of the regulator from being carried beyond the limits of its normal movement, a limit switch 84 is provided which is actuated by projections of the wheel-segment 8 and serves to interrupt the circuits of the clutch magnets 5 and 6.

The operation of and the circuit connections for the system are as follows: Assuming that the motor 1 is operating at a substantially constant speed and that the clutches 3 and 4 are inactive, the various parts of the apparatus occupying the positions shown in the drawings; if the regulator is intended to maintain a constant potential on a two-phase distributing circuit 85—86, 87—88, which is supplied with energy from a generator 89, and, if the potential falls slightly below the predetermined value, the meter relay 83 will first bring the movable contact member 90 into engagement with contact member 91. A control circuit is then established from conductor 92 of a low-voltage circuit 92—93, 94—95, which may be derived from the main circuit, through conductor 96, contact members 90 and 91, conductor 97, electro-magnet 78 and conductor 98 to conductor 93. Electro-magnet 78, when energized, brings movable contact members 100 and 101, respectively, into engagement with stationary contact members 82 and 81, thereby completing a circuit from conductor 96, through contact members 100 and 82, conductor 96, through contact members 100 and 82, conductor 102, coil 58 of electro-magnet 5, conductor 103, contact members 104 and 105 of limit switch 84 and conductor 106 to conductor 93. The circuit for the coil 59 of the same electro-magnet is completed through contact members 101 and 81 of the secondary relay switch. The electro-magnet 5, when energized, releases the brake 7 and sets the clutch 3, as already described, so that the motor rotation is transmitted through the shaft 28, gears 33 and 36, shaft 37, gears 28, 34 and 35, shaft 39 and worm gears 9 and 8 to the regulator shaft 10. Such rotative movement of the regulator is thus produced as to correct the potential variation which occurred on the line and when the correction is effected, the meter relay 83 becomes inactive, deënergizing the magnet 78, which, in turn, effects the interruption of the circuits for the electro-magnet 5. When deënergized, the electro-magnet 5 permits the spring 69 to apply the brake 7, and, at the same time, releases the clutch 3 so that the regulator is stopped instantly; while the motor 1 is permitted to rotate without load. In a similar manner, if the potential of the main circuit rises above the predetermined mean value, the primary relay 83 will energize the electro-magnet 77, which, in turn, will cause the electro-magnet 6 to be energized and the clutch 4 to be actuated. The clutch 4, when set, produces such a rotative movement of the regulator as to correct the voltage variation just assumed.

In operation, the regulator will, of course, be adjusted first in one direction and then in another, and, under normal conditions, will not be moved to any great distance from its mid position. If, for any reason, the regulator continues to move in one direction until the limit of its permissible travel is reached, either a pawl 107 or a pawl 108 will trip the limit switch to interrupt the circuit of the energized clutch magnet.

The limit switch illustrated comprises a base or bracket 110, a pair of sleeves 111 and a pair of bell-crank levers 112, rotatably supported thereon, pawls 113 which are attached to the sleeves and contact fingers which are secured to and are insulated from the sleeves. The bell-crank levers are oppositely mounted on a stud 114 and are provided with latch projections which are respectively adapted to engage the extremities of the pawls. Springs 115 tend to cause the contact fingers to move out of engagement with the coöperating stationary contact members, but their action is opposed by the bell-crank levers except when said levers are tripped by the pawls 107 or 108. The limit switch forms no part of this invention and may be replaced by any other suitable means for accomplishing the same purpose.

The operating mechanism of my invention may obviously be utilized for other purposes in connection with motor-operated controllers and other electric apparatus and I desire to include within the spirit and scope of my invention such structural modifications and such adaptations as will suggest themselves to those skilled in the art.

I claim as my invention:

1. In electric apparatus, the combination with a movable member capable of a limited adjustment, of a motor adapted to rotate continuously in one direction, two sets of interposed gearing for producing adjustments of the movable member in the one direction or the other, independent driving clutches adjacent to the motor and associated with the two sets of gearing, electro-responsive means for selectively actuating the clutches, and mechanical means for preventing the setting of both clutches at the same time.

2. In electric apparatus, the combination with a movable member capable of a limited adjustment in either direction, a brake for holding the movable member at rest, a motor adapted to operate continuously in one direction, and two sets of interposed gearing for rendering the motor effective in producing adjustments of the movable member in either direction, of electro-responsive means for selectively completing driving connections between the motor and the two sets of gearing, said means being interlocked and connected with the brake by a system of links and levers to prevent both sets of gearing from being active at the same time, and to release the brake when either set is active.

3. In a regulator, the combination with a stationary member, of a movable member associated therewith and capable of a limited adjustment in either direction, of a driving motor adapted to operate continuously in one direction, two independent driving clutches located one on each side of the motor, interposed gears, electro-responsive means for selectively actuating the clutches, and mechanical means for so interlocking the electro-responsive means as to preclude the concurrent actuation of the clutches.

4. In a regulator, the combination with a movable member, and a driving motor adapted to operate continuously in the same direction, of two sets of interposed gears for producing opposite rotary adjustments of the movable member, and friction clutches one on each side of the motor and between the motor and the respective sets of gears, means for selectively actuating the clutches and means for independently adjusting the pressure exerted on each of the clutches.

5. The combination with a movable member and a brake therefor, of a continuously operating motor and interposed gearing for transmitting the motion of the motor to the movable member, said gearing comprising driving clutches adjacent to the motor, means for releasing the brake when either of the clutches is set, and means for releasing the clutch that is set when the movable member has reached predetermined positions.

6. The combination with a movable member, a brake for holding the movable member at rest and a continuously operating motor, of a pair of clutches associated with the motor for effecting opposite driving connections between the motor and the movable member, means for selectively actuating the clutches, means for releasing the brake when either of the clutches is actuated, and means for releasing the clutch that is set when the movable member has reached predetermined positions.

7. The combination with a movable member, a brake for holding the movable member at rest and a continuously operating motor, of a pair of clutches associated with the motor for effecting opposite driving connections between the motor and the movable member, electromagnets for selectively actuating the clutches, means for preventing both clutches from being actuated at the same time, and means for releasing the brake when either of the clutches is actuated.

8. The combination with a movable member, a continuously operating driving motor therefor and a brake for holding the movable member at rest, of interposed gearing between the motor and the movable member, comprising normally released clutches, means for mechanically connecting said clutches and said brake to prevent the setting of both clutches at the same time and to effect the release of the brake when either of the clutches is set.

9. The combination with a continuously rotating motor, of a pair of clutches associated therewith comprising movable members, actuating levers therefor, electromagnets for respectively actuating the levers, two pairs of toggle links adapted to be straightened by the electro-magnets to actuate the levers and to materially relieve the electromagnets when the clutches are set, said pairs of links being interconnected to prevent the setting of both clutches at the same time.

10. The combination with a movable member, a brake associated therewith, a continuously operating motor and suitable gearing between the motor and the movable member for effecting rotation of said member in either direction, said gearing comprising a pair of normally released clutches, of actuating levers for the clutches, electromagnets for actuating the levers, toggle links for relieving the electromagnets when the clutches are set and means for so interconnecting the links and the brake as to prevent the setting of both clutches at the same time and to release the brake when either clutch is set.

11. The combination with a continuously operating motor, a pair of clutches associated therewith composed of relatively stationary clutch members secured to the motor shaft, relatively movable clutch members cooperating with the stationary members, actuating levers for the movable clutch members each composed of two spring-connected parts for maintaining a constant clutch pressure when the clutch is set and means for adjusting the tension of the connecting spring, and electro-responsive means for actuating the levers.

12. In an induction regulator, the combination with a stationary member and a movable member associated therewith and capable of limited adjustment in either direction, of a brake for said movable member, a pair of driving clutches, interposed gears and electro-responsive means for selectively actuating the clutches, said electro-responsive means being so interlocked as to preclude concurrent actuation of the clutches and to release the brake when either of the clutches is actuated.

13. The combination with a movable member, a brake for said member, and a continuously operating motor, of a pair of clutches coacting with said motor, means for operatively connecting said clutches to said movable member, means comprising solenoids for actuating the clutches, means comprising mechanical connections for preventing the simultaneous actuation of the clutches, and means for releasing said clutches when said movable member has reached predetermined positions.

In testimony whereof, I have hereunto subscribed my name this 26th day of Jan., 1910.

HENRY D. JAMES.

Witnesses:
H. E. McWILTRY,
B. B. HINES.

---

Correction in Letters Patent No. 1,116,432.

It is hereby certified that in Letters Patent No. 1,116,432, granted November 10, 1914, upon the application of Henry D. James, of Pittsburgh, Pennsylvania, for an improvement in "Regulators for Electric Circuits," an error appears in the printed specification requiring correction as follows: Page 3, lines 60–62, strike out the words and reference numerals "conductor 96, through contact members 100 and 82;" and that the said Letters Patent should be read with this correction therein that the same may conform to the record of the case in the Patent Office.

Signed and sealed this 15th day of December, A. D., 1914.

[SEAL.]

J. T. NEWTON,

*Acting Commissioner of Patents.*